US009575612B2

(12) United States Patent
Zhang

(10) Patent No.: US 9,575,612 B2
(45) Date of Patent: Feb. 21, 2017

(54) ELECTROMAGNETIC INDUCTIVE TOUCH PANEL, ELECTROMAGNETIC INDUCTIVE TOUCH DISPLAY PANEL AND ELECTROMAGNETIC INDUCTIVE TOUCH DISPLAY DEVICE

(71) Applicants: Shanghai Tianma Micro-Electronics Co., Ltd, Shanghai (CN); Tianma Micro-Electronics Co., Ltd., Shenzhen (CN)

(72) Inventor: Xianxiang Zhang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 382 days.

(21) Appl. No.: 14/481,382

(22) Filed: Sep. 9, 2014

(65) Prior Publication Data

US 2015/0355758 A1 Dec. 10, 2015

(30) Foreign Application Priority Data

Jun. 6, 2014 (CN) .......................... 2014 1 0250192

(51) Int. Cl.
*G06F 3/046* (2006.01)
*G06F 3/041* (2006.01)
(52) U.S. Cl.
CPC ............. *G06F 3/046* (2013.01); *G06F 3/0416* (2013.01)

(58) Field of Classification Search
CPC .................... G06F 3/046; G06F 3/0416; G06F 2203/04103; G06F 2203/04106
See application file for complete search history.

(56) References Cited

U.S. PATENT DOCUMENTS

| 2012/0313871 A1* | 12/2012 | Tsai | ........................ G06F 3/044 345/173 |
| 2014/0078104 A1* | 3/2014 | Lee | ........................ G06F 3/044 345/174 |
| 2014/0118283 A1 | 5/2014 | Wang et al. | |

(Continued)

FOREIGN PATENT DOCUMENTS

| CN | 101526679 A | 9/2009 |
| CN | 201590069 U | 9/2010 |

(Continued)

*Primary Examiner* — Tom Sheng
(74) *Attorney, Agent, or Firm* — Alston & Bird LLP

(57) ABSTRACT

An electromagnetic inductive touch panel includes a first substrate and a touch structure layer disposed on the first substrate. The touch structure layer includes a plurality of first wires; a plurality of second wires insulatedly intersecting with the plurality of first wires; and a plurality of electromagnetic inductive coils disposed respectively at intersections of the first wires with the second wires. Each of electromagnetic inductive coils includes a first sub-coil and a second sub-coil spirally wrapped around each other. The first sub-coil has one end electrically connected with one of the first wires and the other end electrically connected with a common potential; and the second sub-coil has one end electrically connected with one of the second wires and the other end electrically connected with the common potential.

20 Claims, 5 Drawing Sheets

(56) References Cited

U.S. PATENT DOCUMENTS

2015/0022488 A1\* 1/2015 Xi .................... G06F 3/047
   345/174
2016/0154511 A1\* 6/2016 Yao .................. G06F 3/0412
   345/174

FOREIGN PATENT DOCUMENTS

| CN | 101526679 B | 11/2010 |
| CN | 101916144 A | 12/2010 |
| JP | 57101931 A | 6/1982 |
| JP | 4821544 B2 | 9/2011 |

\* cited by examiner

US 9,575,612 B2

ELECTROMAGNETIC INDUCTIVE TOUCH PANEL, ELECTROMAGNETIC INDUCTIVE TOUCH DISPLAY PANEL AND ELECTROMAGNETIC INDUCTIVE TOUCH DISPLAY DEVICE

CROSS-REFERENCES TO RELATED APPLICATIONS

This application claims the benefit of priority to Chinese Patent Application No. 201410250192.1, filed with the Chinese Patent Office on Jun. 6, 2014 and entitled "ELECTROMAGNETIC INDUCTIVE TOUCH PANEL, ELECTROMAGNETIC INDUCTIVE TOUCH DISPLAY PANEL AND ELECTROMAGNETIC INDUCTIVE TOUCH DISPLAY DEVICE", the content of which is incorporated herein by reference in its entirety.

TECHNICAL FIELD

The present invention relates to the field of electromagnetic inductive touch technologies and particularly to an electromagnetic inductive touch panel, an electromagnetic inductive touch display panel including the electromagnetic inductive touch panel, an electromagnetic inductive touch display device including the electromagnetic inductive touch panel and an electromagnetic inductive touch display device including the electromagnetic inductive touch display panel.

BACKGROUND OF THE INVENTION

In recent years, touch panels and display panels and display devices with a touch function have been increasingly popular as they become user-friendly, convenient and prompt to operate. The touch panels can be categorized by their different operation principles into, for example, a resistive-type touch panel, a capacitive-type touch panel, an electromagnetic inductive-type touch panel, etc. Particularly, the resistive touch panel and the capacitive touch panel are advantageous in their possibility of being operated directly with a hand or finger. However it may be difficult to distinguish touching by the hand or finger from touching by a stylus while writing with the stylus because the hand or finger is generally placed on the touch panel. The electromagnetic inductive touch panel generally includes a plurality of electromagnetic inductive coils or antennas disposed in the X and Y direction and a positioning device (e.g., an electromagnetic stylus). The position of the electromagnetic stylus can be determined accurately by the electromagnetic inductive touch panel even if the hand or finger is placed on the touch panel.

FIG. 1 illustrates a schematic diagram of a circuit structure of a conventional electromagnetic inductive touch panel. As illustrated in FIG. 1, the electromagnetic inductive touch panel includes a plurality of X-direction detection lines 11, a plurality of Y-direction detection lines 12 insulatedly intersecting with the plurality of X-direction detection lines 11, and a plurality of coils 13 disposed in a matrix (e.g., a 3×3 matrix of coils as illustrated) to be respectively at the intersections of the X-direction detection lines 11 with the Y-direction detection lines 12. Each of the coils 13 is provided with two ends including one end connected with both a corresponding X-direction detection line 11 and a corresponding Y-direction detection line 12, and the other end grounded through a common electrode line 17. Each of the X-direction detection lines 11 and each of the Y-direction detection lines 12 are connected with a corresponding X-direction detection circuit 15 and a corresponding Y-direction detection circuit 16 through a current amplifier 14. If an electromagnetic stylus induces inductive current in some electromagnetic inductive coil 13, then the inductive current will be detect by the X-direction detection circuit 15 and the Y-direction detection circuit 16 to thereby determine the coordinates of the position where touching occurs.

BRIEF SUMMARY OF THE INVENTION

An embodiment of the invention provides an electromagnetic inductive touch panel including: a first substrate and a touch structure layer disposed on the first substrate, the touch structure layer including: a plurality of first wires; a plurality of second wires insulatedly intersecting with the plurality of first wires; and a plurality of electromagnetic inductive coils disposed respectively at intersections of the first wires with the second wires, each of which includes a first sub-coil and a second sub-coil wrapped around each other; wherein the first sub-coil has one end electrically connected with one of the first wires and the other end electrically connected with a common potential; and the second sub-coil has one end electrically connected with one of the second wires and the other end electrically connected with the common potential.

Another embodiment of the invention provides an electromagnetic inductive touch display panel including the electromagnetic inductive touch panel above.

Another embodiment of the invention provides an electromagnetic inductive touch display device including the electromagnetic inductive touch panel above.

Another embodiment of the invention provides an electromagnetic inductive touch display device including a display panel and the electromagnetic inductive touch panel above, the display panel and the electromagnetic inductive touch panel being disposed in a stacked structure.

DETAILED DESCRIPTION OF THE PREFERRED EMBODIMENTS

Figure 1:
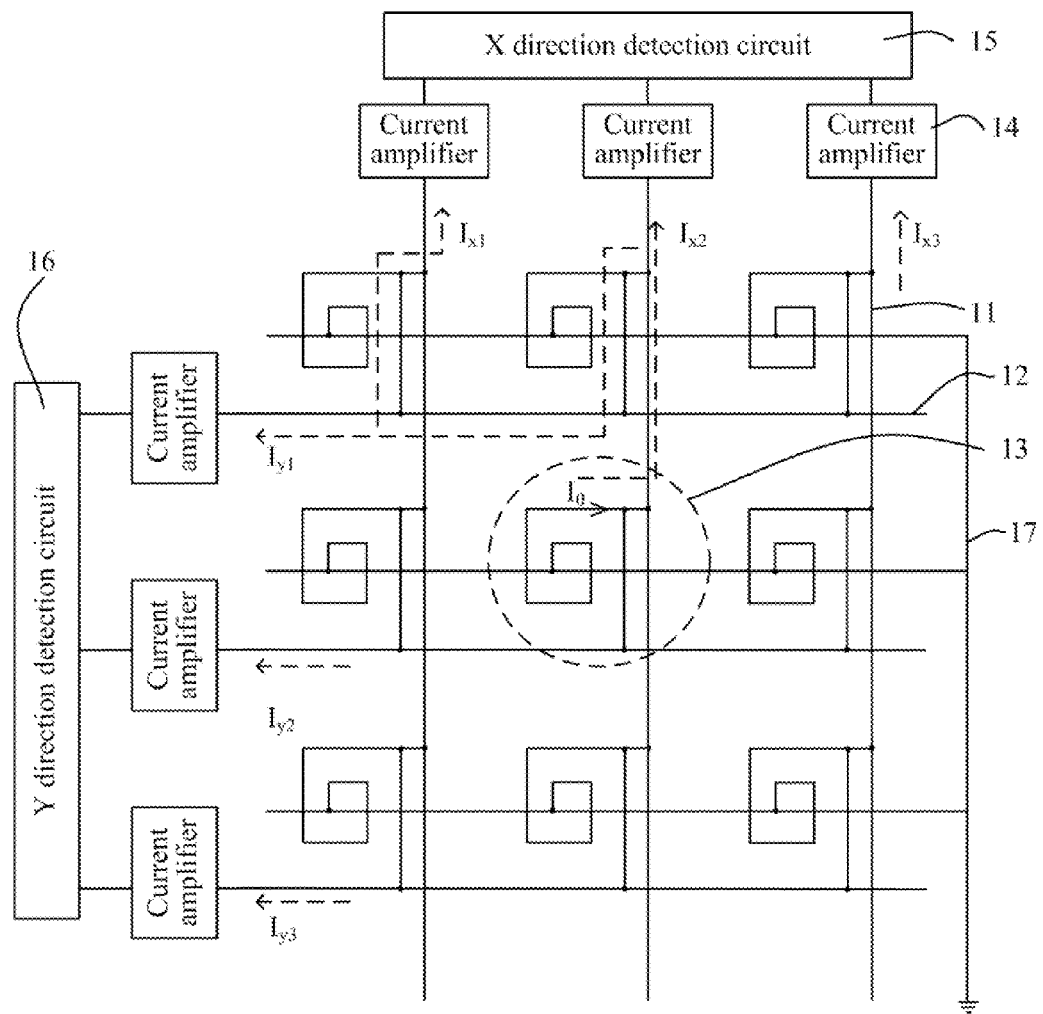
FIG. 1 is a schematic diagram of a circuit structure of an electromagnetic inductive touch panel in the prior art.

As can be seen from FIG. 1, the inventor found that the X-direction detection lines 11 and the Y-direction detection lines 12 are connected at the one ends of the electromagnetic inductive coils 13, so for any of the electromagnetic inductive coils 13, e.g., the electromagnetic inductive coil denoted by the dotted circle in FIG. 1, inductive current I0 generated by the electromagnetic inductive coil will be transmitted to all of detection ports through the X-direction detection lines 11 and the Y-direction detection lines 12 electrically connected with each other. That is, the inductive current I1 will be transmitted to all the detection ports in the X direction and the Y direction over the paths denoted by the dotted lines in FIG. 1 so that the respective ports can detect Ix1, Ix2, Ix3, Iy1, Iy2 and Iy3 respectively. In other words, the inductive current generated by any of the electromagnetic inductive coils will be divided into six branches, i.e., Ix1, Ix2, Ix3, Iy1, Iy2 and Iy3. The X-direction detection circuit 15 needs to select the highest current from Ix1, Ix2 and Ix3 to determine the coordinate of the touch position in the X direction; and the Y-direction detection circuit 16 needs to select the highest current from Iy1, Iy2 and Iy3 to determine the coordinate of the touch position in the Y direction. However the division of the inductive current I0 into the six branches may greatly lower the strength of and consequently the ratio of signal to noise of a signal. Moreover it may be more and more difficult to detect the six current values Ix1, Ix2, Ix3, Iy1, Iy2 and Iy3 as time goes on because the differences between the six current values Ix1, Ix2, Ix3, Iy1, Iy2 and Iy3 are lowered by the X-direction detection lines 11 and the Y-direction detection lines 12 connected with each other.

An essential idea of the invention lies in that each electromagnetic inductive coil in an electromagnetic inductive touch panel includes a first sub-coil and a second sub-coil wrapped around each other, and the first sub-coil and the second sub-coil are electrically connected in one-to-one correspondence respectively with a first wire and a second wire insulatedly intersecting with each other; and inductive current is generated in both the first sub-coil and the second sub-coil in touch sensing to thereby increase effective inductive current detected on the first wire and the second wire so as to improve the strength of and the ratio of signal to noise of a detected effective signal.

An Embodiment

Figure 2:
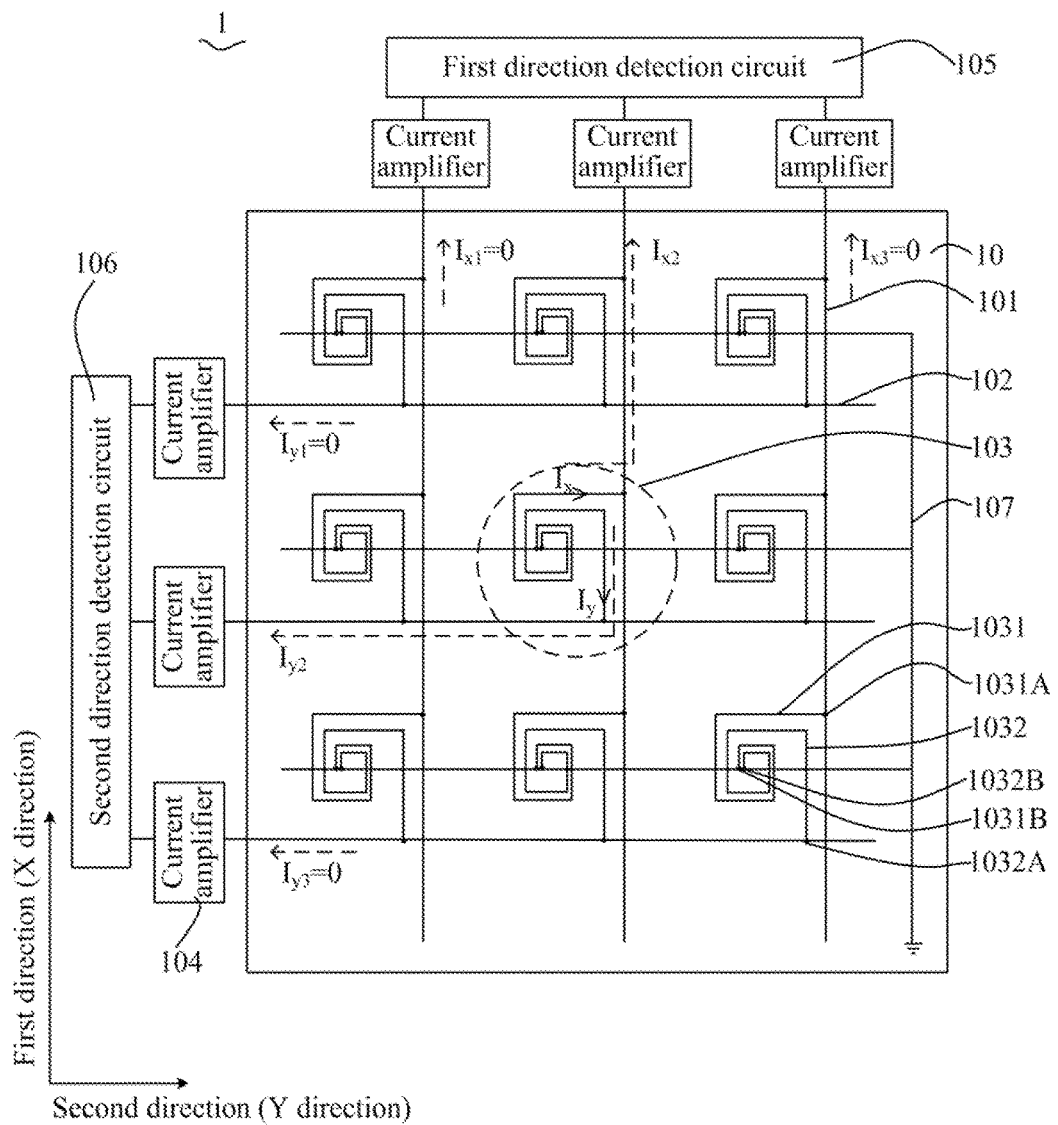
FIG. 2 is a schematic structural diagram of an electromagnetic inductive touch panel according to an embodiment of the invention in a top view.

FIG. 2 is a schematic structural diagram of an electromagnetic inductive touch panel according to an embodiment of the invention in a top view. As showed in FIG. 2, the electromagnetic inductive touch panel 1 includes: a first substrate 10 and a touch structure layer disposed on the first substrate 10.

The touch structure layer includes: a plurality of first wires 101 (typically parallel or substantially parallel to each other); a plurality of second wires 102 (typically parallel or substantially parallel to each other) insulatedly intersecting with (typically perpendicular or substantially perpendicular to) the plurality of first wires 101; and a plurality of electromagnetic inductive coils 103 disposed respectively at the intersections of the first wires 101 with the second wires 102, each of which includes a first sub-coil 1031 and a second sub-coil 1032 spirally wrapped around each other. In other words, each of the electromagnetic inductive coils 103 has a one-layer double spiral coil pattern.

Particularly, the first sub-coil 1031 has one end 1031A electrically connected with the first wire 101 and the other end 1031B electrically connected with a common potential (typically grounded); and the second sub-coil 1032 has one end 1032A electrically connected with the second wire 102 and the other end 1032B electrically connected with the common potential (typically grounded).

Thus in a touch detection process, when a magnetic field line passes one of the electromagnetic inductive coils 103, first inductive current Ix is generated in the first sub-coil 1031 and transmitted to the first wire 101, and second inductive current Iy is generated in the second sub-coil 1032 and transmitted to the second wire 102, so that the coordinates of a touch position are determined by the electromagnetic inductive touch panel 1 from the first inductive current Ix and the second inductive current Iy. Particularly when touching occurs, an electromagnetic signal generated by an electromagnetic stylus (not illustrated, which can be an active electromagnetic stylus or a passive electromagnetic stylus) induces inductive current generated in one or more of the electromagnetic inductive coils 103 in the electromagnetic inductive touch panel 1. Taking the electromagnetic inductive coil 103 denoted by the dotted circle in FIG. 2 as an example, when the electromagnetic inductive coil 103 is excited by the electromagnetic stylus to generate inductive current and the remaining electromagnetic inductive coils are not excited to generate inductive current, the first inductive current Ix is generated in the first sub-coil 1031, and the second inductive current Iy is generated in the second sub-coil 1032. The first inductive current Ix is transmitted to the corresponding electrically connected first wire 101, and current Ix2 detected at a corresponding detection end of the first wire which is the second one from the left to the right in FIG. 2 is not zero, and current Ix1 and Ix3 detected at corresponding detection ends of the remaining first wires are zero or almost 0, so that the value of the coordinate of the touch position in a first direction (the X direction) can be determined by the electromagnetic inductive touch panel 1 from the current Ix2. Similarly, the second inductive current Iy is transmitted to the corresponding electrically connected second wire 102, and current Iy2 detected at a corresponding detection end of the second wire which is the second from the top to the bottom in FIG. 2 is not zero, and current Iy1 and Iy3 detected at corresponding detection ends of the remaining second wires are zero or almost 0, so that the value of the coordinate of the touch position in a second direction (the Y direction) can be determined by the electromagnetic inductive touch panel 1 from the current Iy2. Thus both the values of the coordinates of the touch position in the first direction and the second direction can be determined.

In a further preferred implementation of the embodiment, the first sub-coil 1031 and the second sub-coil 1032 are designed in size and shape so that the first inductive current Ix generated by the first sub-coil 1031 and the second inductive current Iy generated by the second sub-coil 1302 satisfies $0 \leq |Ix-Iy|/MAX(Ix, Iy) \leq 10\%$, where Max (Ix–I) represents the larger one of the first inductive current Ix and the second inductive current Iy, and $|Ix-Iy|$ is the absolute value of the difference between Ix and Iy. Further preferably $0 \leq ||Ix-Iy||/MAX(Ix-31\ Iy) \leq 5\%$. Moreover typically the wire of the first sub-coil 1031 extends in the same direction as the wire of the second sub-coil 1302, that is, both of them extend clockwise (as illustrated in FIG. 2) or counterclockwise. Thus in the electromagnetic inductive coil 103, the first inductive current Ix is generated by the first sub-coil 1031 in the same direction as the second inductive current Iy generated by the second sub-coil 1302. Particularly both the one end 1031A of the first sub-coil 1031 and the one end 1032A of the second sub-coil 1302 are typically disposed at the periphery of the electromagnetic inductive coil 103, and both the other end 1031B of the first sub-coil 1031 and the other end 1032B of the second sub-coil 1302 are typically disposed at the center of the electromagnetic inductive coil 103. If the direction of the first inductive current Ix points from the end 1031B to the end 1031A of the first sub-coil (the potential of 1031B is 0V and the potential of 1031A is positive), i.e., clockwise, then the direction of the second inductive current Iy points from the end 1032B to the end 1032A of the second sub-coil (the potential of 1032B is 0V and the potential of 1032A is positive), i.e., also clockwise.

Typically an insulation layer (not illustrated) is disposed between the first wire 101 and the second wire 102. The first sub-coil 1031 and the second sub-coil 1032 in the electromagnetic inductive coil 103 can be disposed at different layers; for example, the first sub-coil 1031 is disposed at the same layer and made of the same material as the first wire 101, and the second sub-coil 1032 is disposed at the same layer and made of the same material as the second wire 102. Of course the first sub-coil 1031 and the second sub-coil 1032 in the electromagnetic inductive coil 103 can be disposed at the same layer and made of the same material; for example, both the first sub-coil 1031 and the second sub-coil 1032 are disposed at the same layer and made of the same material as the first wire 101, or both the first sub-coil 1031 and the second sub-coil 1032 are disposed at the same layer and made of the same material as the second wire 102. The first and second sub-coils may be spirally configured coils that can be square or rectangular shapes.

Moreover, both the other end 1031B of the first sub-coil 1031 and the other end 1032B of the second sub-coil 1032 in the electromagnetic inductive coil 103 can be electrically connected with a common electrode line 107 and grounded through the common electrode line 107. FIG. 2 illustrates a plurality of common electrode lines 107 connected together peripherally on the first substrate 10 by way of an example. The common electrode lines 107 can be disposed at the same layer and made of the same material as the first wires 101; or the common electrode lines 107 can be disposed at the same layer and made of the same material as the second wires 102. In another optional implementation, a common electrode can be an integral structure (of, e.g., ITO, IZO or other transparent electrically conductive materials) covering a surface of the first substrate 10. In an embodiment, the common electrode may cover almost the entire surface of the touch screen or the display panel. Both the other end 1031B of the first sub-coil 1031 and the other end 1032B of the second sub-coil 1032 are electrically connected with the common electrode.

As can be seen from FIG. 2, the electromagnetic inductive touch panel 1 further includes a first direction detection circuit 105 and a second direction detection circuit 106, where each of the first wires 101 is electrically connected with the first direction detection circuit 105, and each of the second wires 102 is electrically connected with the second direction detection circuit 106.

In order to further improve the strength of a detection signal, the electromagnetic inductive touch panel 1 further includes a plurality of current amplifiers 104, where each of the first wires 101 is electrically connected with the first direction detection circuit 105 through one of the current amplifiers 104, and each of the second wires 102 is electrically connected with the second direction detection circuit 106 through one of the current amplifiers 104.

Another Embodiment

Figure 3:
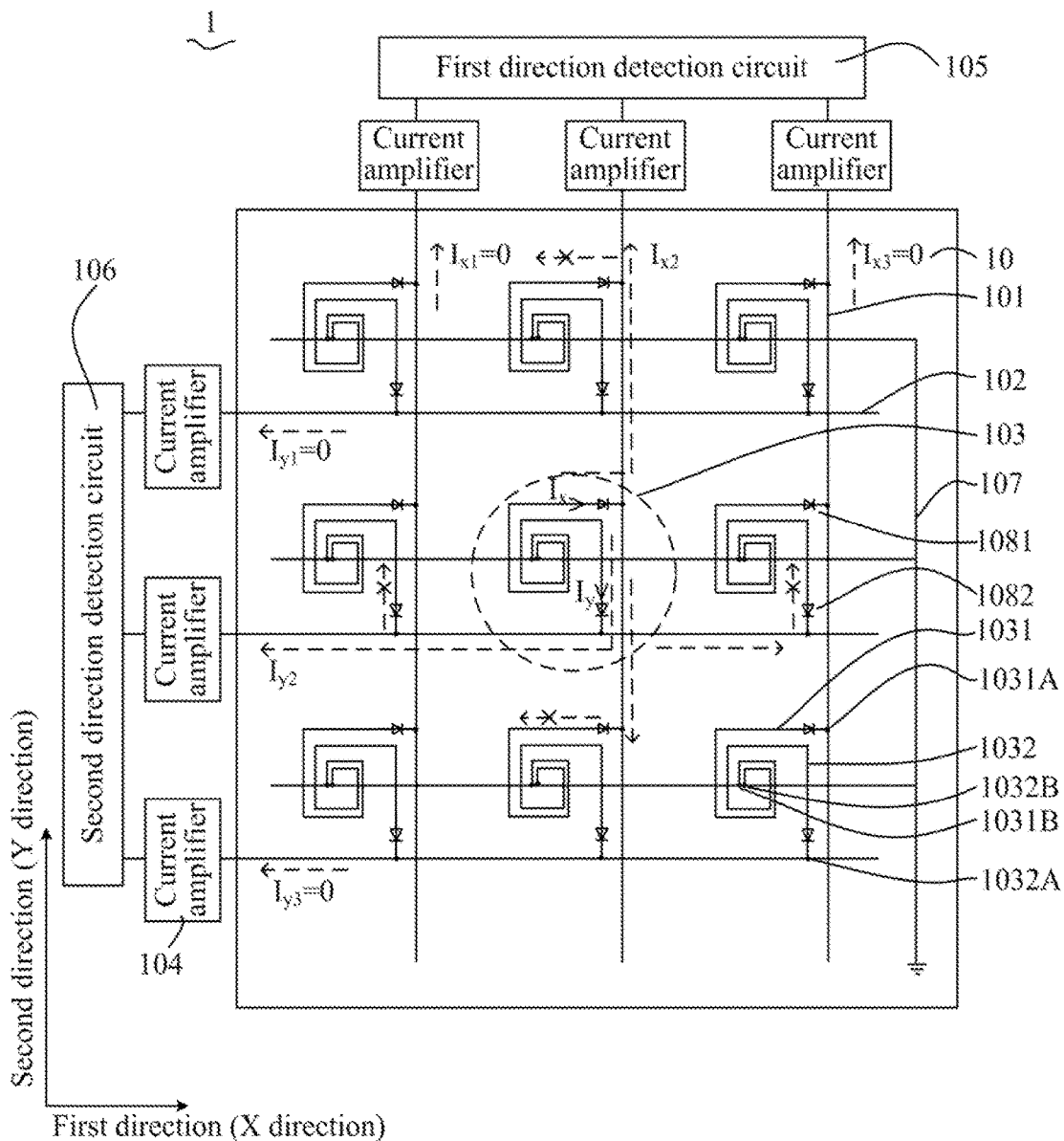
FIG. 3 is a schematic structural diagram of an electromagnetic inductive touch panel according to another embodiment of the invention in a top view.

FIG. 3 illustrates a schematic structural diagram of an electromagnetic inductive touch panel according to another embodiment of the invention in a top view. The electromagnetic inductive touch panel according to this embodiment relates to an improvement to the electromagnetic inductive touch panel according to the foregoing embodiment, so a repeated description of the same components thereof as those in the foregoing embodiment will be omitted here, but their differences will be highlighted below.

As can be apparent from FIG. 3, the electromagnetic inductive touch panel according to this embodiment further includes a plurality of diodes in addition to the foregoing embodiment illustrated in FIG. 2. Particularly a first diode 1081 is further disposed between each of the first sub-coils 1031 and the first wire 101, and a second diode 1082 is further disposed between each of the second sub-coils 1032 and the second wire 102. In an alternative implementation, only the first diode 1081 is further disposed between each of the first sub-coils 1031 and the first wire 101, but no second diode 1082 is disposed between each of the second sub-coils 1032 and the second wire 102; or only the second diode 1082 is further disposed between each of the second sub-coils 1032 and the second wire 102, but no first diode 1081 is disposed between each of the first sub-coils 1031 and the first wire 101. Typically, the first diode and the second diode are preferably Schottky diodes.

Moreover, the first diodes 1081 are connected with the same first wire 101 at their same poles, that is, the first diodes 1081 are connected with the same first wire 101 at their cathodes as illustrated in FIG. 3; and of course they can be connected at their anodes (not illustrated). Likewise, the second diodes 1082 are connected with the same second wire 102 at their same poles, that is, the second diodes 1082 are connected with the same second wire 102 at their cathodes as illustrated in FIG. 3; and of course they can be connected at their anodes (not illustrated). Furthermore, all the first diodes 1081 are connected with the first wires 101 at their same poles and/or all the second diodes 1082 are connected with the second wires 102 at their same poles.

Another Embodiment

An electromagnetic inductive touch display panel according to another embodiment of the invention includes the electromagnetic inductive touch panel according to either of the foregoing embodiments above. The electromagnetic inductive touch display panel can be a liquid crystal display panel or an electronic paper or a plasma display panel or an organic light emitting diode display panel.

Figure 4:
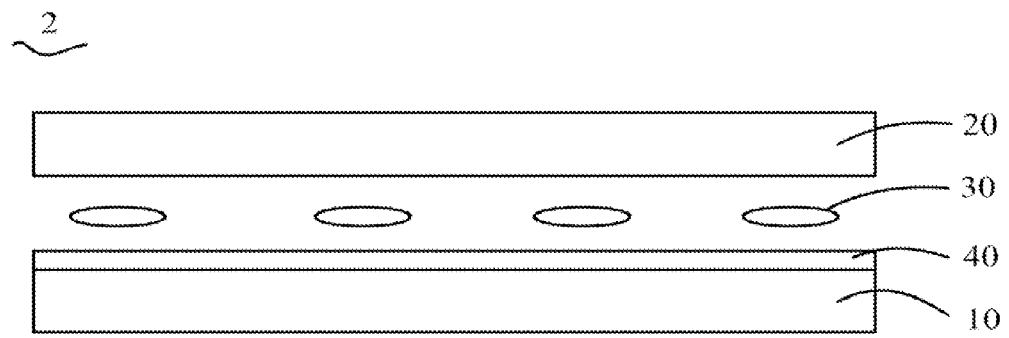
FIG. 4 is a schematic structural diagram of an electromagnetic inductive touch liquid crystal display panel according to another embodiment of the invention in a sectional view.
Figure 5:
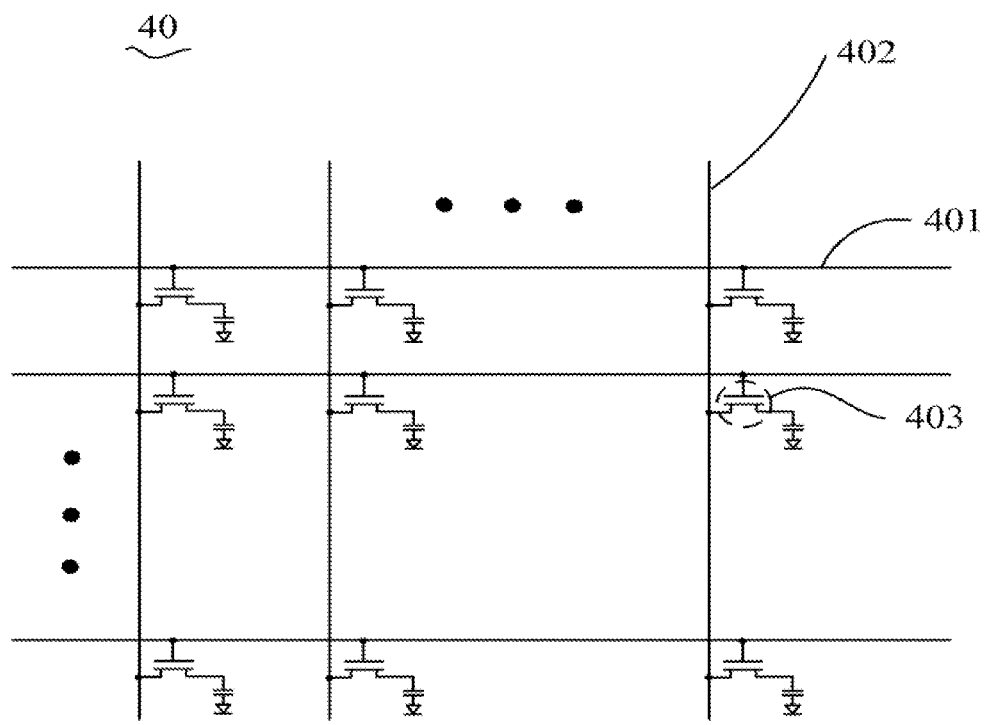
FIG. 5 is a schematic diagram of a pixel array according to the embodiment corresponding to FIG. 4 in a top view.

FIG. 4 illustrates a sectional view of the electromagnetic inductive touch display panel which is a liquid crystal display panel. As can be apparent from FIG. 4, the electromagnetic inductive touch display panel 2 further includes a second substrate 20 disposed in opposition to the first substrate 10, and a liquid crystal layer 30 disposed between the first substrate 10 and the second substrate 30. The first substrate 10 and the second substrate 20 can be made of glass, quartz, plastic or other materials. FIG. 5 illustrates in a top view a schematic structural diagram of a pixel array 40 which is further disposed between the second substrate 30 and the first substrate 10. As can be apparent from FIG. 5, the pixel array 40 includes a plurality of third wires 401 and a plurality of fourth wires 402 insulatedly intersecting with each other. The pixel array 40 further includes TFTs at the intersections of the third wires 401 with the fourth wires 402. The touch structure layer can be fabricated together with the pixel array 40, where both of them are fabricated in the same process flow; and even a part or all of the touch structure layer can be made of the existing components in the pixel array 40, for example, the first wires 101 are disposed at the same layer as and made of the same material as the third wires 401, and the second wires 102 are disposed at the same layer as and made of the same material as the fourth wires 402. Alternatively, the third wires 401 and the first wires 101 are the same wires, and the fourth wires 402 and the second wires 102 are the same wires. At this time the functions of electromagnetic inductive detection and image display are performed in time division. In this embodiment, the third wires are scan lines, and the fourth wires are data lines, by way of an example, but actually the third wires and the fourth wires can be any two types of wires insulatedly intersecting with each other among scan lines, data lines, storage capacitor electrode lines, bias lines, repair lines, control lines, etc. Moreover the plurality of third wires 401 are typically disposed parallel or substantially parallel to each other, and the plurality of fourth wires 402 are typically disposed parallel or substantially parallel to each other.

Another Embodiment

Figure 6:
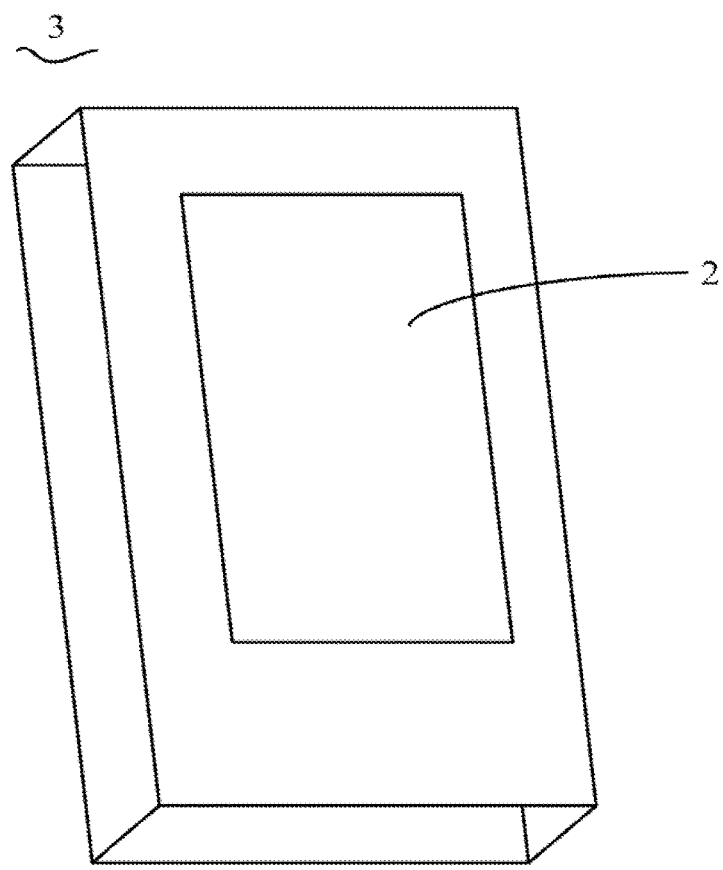
FIG. 6 is a schematic structural diagram of an electromagnetic inductive touch display device according to another embodiment of the invention.

FIG. 6 illustrates an electromagnetic inductive touch display device 3 according to another embodiment of the invention, which includes the electromagnetic inductive touch display panel 2 according to the embodiment above corresponding to FIG. 4.

Another Embodiment

Figure 7:
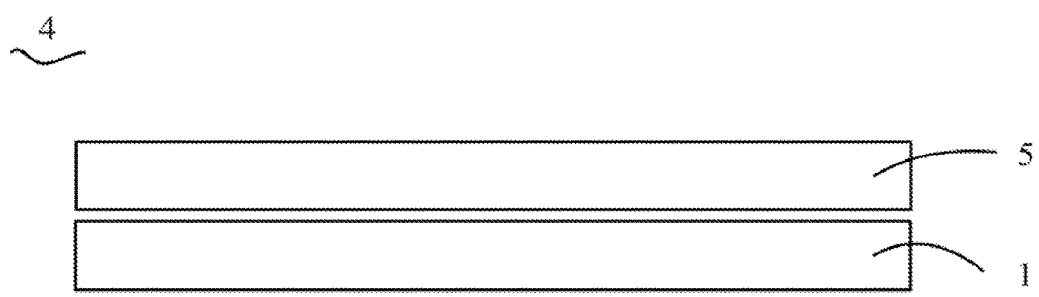
FIG. 7 is a schematic structural diagram of an electromagnetic inductive touch display device according to another embodiment of the invention.

FIG. 7 illustrates an electromagnetic inductive touch display device 4 according to another embodiment of the invention, which includes a display panel 5 and the electromagnetic inductive touch panel 1 according to either of the embodiments above corresponding to FIG. 2 and FIG. 3, where the display panel 5 and the electromagnetic inductive touch panel 1 are disposed in a stacked structure.

It shall be noted that the electromagnetic inductive touch panel in the embodiments above is disposed with only a 3×3 matrix of coils, but the invention will not be limited thereto, but it can alternatively be disposed in an N×N matrix of coils in other embodiments, where N is an integer larger than or equal to 2.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An electromagnetic inductive touch panel, comprising: a first substrate and a touch structure layer disposed on the first substrate, the touch structure layer comprising: a plurality of first wires; a plurality of second wires insulatedly intersecting with the plurality of first wires; and a plurality of electromagnetic inductive coils disposed respectively at intersections of the first wires with the second wires, each of the electromagnetic inductive coils comprising a first sub-coil and a second sub-coil wrapped around each other;

wherein the first sub-coil has one end electrically connected with one of the first wires and the other end electrically connected with a common potential; and the second sub-coil has one end electrically connected with one of the second wires and the other end electrically connected with the common potential.

2. The electromagnetic inductive touch panel according to claim 1, wherein, when a magnetic field line passes an electromagnetic inductive coil, a first inductive current is generated in a first sub-coil of the electromagnetic inductive coil and transmitted to one of the first wires, and a second inductive current is generated in a second sub-coil of the electromagnetic inductive coil and transmitted to one of the second wires, so that coordinates of a touch position are determined by the electromagnetic inductive touch panel from the first inductive current and the second inductive current.

3. The electromagnetic inductive touch panel according to claim 2, wherein the first inductive current is defined as Ix and the second inductive current is defined as Iy, and Ix and Iy satisfy the relation:

$$0 \le |Ix-Iy|/MAX(Ix, Iy) \le 10\%$$

wherein |Ix−Iy| is an absolute value of a difference between Ix and Iy, and MAX (Ix, Iy) is a larger of Ix or Iy.

4. The electromagnetic inductive touch panel according to claim 2, wherein the first inductive current flows in a same direction as the second inductive current.

5. The electromagnetic inductive touch panel according to claim 1, wherein both the other end of the first sub-coil and the other end of the second sub-coil are disposed at the center of one of the electromagnetic inductive coils.

6. The electromagnetic inductive touch panel according to claim 1, further comprising a common electrode covering a surface of the first substrate, and both the other end of the first sub-coil and the other end of the second sub-coil are electrically connected with the common electrode.

7. The electromagnetic inductive touch panel according to claim 1, further comprising a plurality of common electrode lines connected together peripherally on the first substrate, and both the other end of the first sub-coil and the other end of the second sub-coil are electrically connected with one of the common electrode lines.

8. The electromagnetic inductive touch panel according to claim 7, wherein the common electrode lines are disposed at a same layer as the first wires or the second wires.

9. The electromagnetic inductive touch panel according to claim 1, wherein the first sub-coils are disposed at a same layer as the first wires, and the second sub-coils are disposed at a same layer as the second wires.

10. The electromagnetic inductive touch panel according to claim 1, wherein the first sub-coils are disposed at a same layer as the second sub-coils.

11. The electromagnetic inductive touch panel according to claim 10, wherein both the first sub-coils and the second sub-coils are disposed at a same layer as the first wires; or both the first sub-coils and the second sub-coils are disposed at a same layer as the second wires.

12. The electromagnetic inductive touch panel according to claim 1, further comprising a plurality of first diodes disposed between first sub-coils and the first wires, and a plurality of second diodes disposed between second sub-coils and the second wires.

13. The electromagnetic inductive touch panel according to claim 12, wherein the first diodes and the second diodes are Schottky diodes.

14. The electromagnetic inductive touch panel according to claim 12, wherein the first diodes are connected with a same first wire at their same poles; and the second diodes are connected with a same second wire at their same poles.

15. The electromagnetic inductive touch panel according to claim 1, further comprising a first direction detection circuit and a second direction detection circuit, each of the first wires being electrically connected with the first direction detection circuit, and each of the second wires being electrically connected with the second direction detection circuit.

16. The electromagnetic inductive touch panel according to claim 15, further comprising a plurality of current amplifiers, each of the first wires being electrically connected with the first direction detection circuit through one of the current amplifiers, and each of the second wires being electrically connected with the second direction detection circuit through one of the current amplifiers.

17. An electromagnetic inductive touch display panel, comprising the electromagnetic inductive touch panel according to claim 1.

18. The electromagnetic inductive touch display panel according to claim 17, further comprising a pixel array disposed on the first substrate, the pixel array comprising a plurality of third wires and a plurality of fourth wires insulatedly intersecting with each other.

19. The electromagnetic inductive touch display panel according to claim 18, wherein the first wires are disposed at a same layer as the third wires and made of a same material as the third wires, and the second wires are disposed at a same layer as the fourth wires and made of a same material as the fourth wires; or the third wires and the first wires are the same wires, and the fourth wires and the second wires are the same wires, and an electromagnetic inductive detection and image display are performed by time division.

20. An electromagnetic inductive touch display device, comprising the electromagnetic inductive touch display panel according to claim 17.

* * * * *